UNITED STATES PATENT OFFICE.

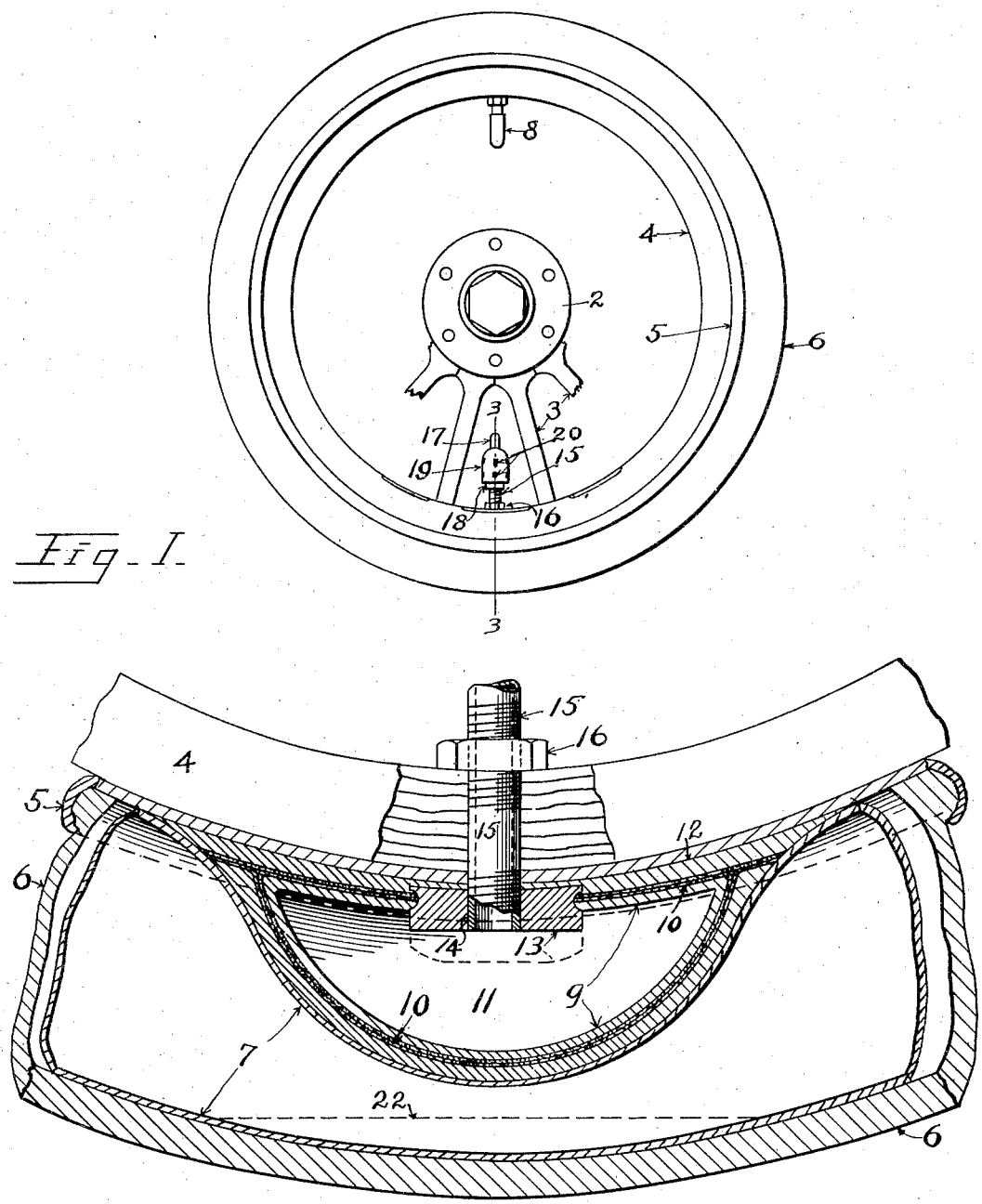

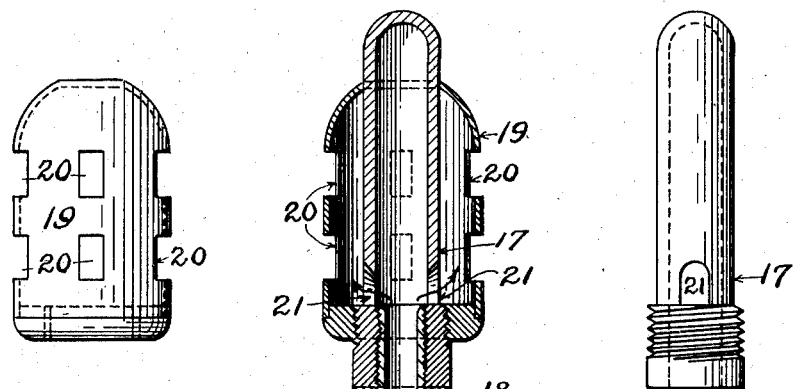
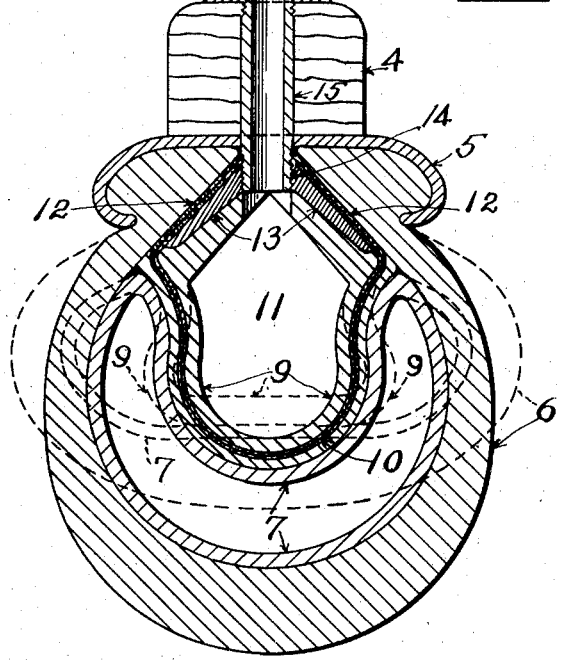

SAMUEL SILVERMAN AND JOSEPH E. TRAHAN, OF WATERTOWN, NEW YORK.

SIGNAL FOR PNEUMATIC TIRES.

No. 928,553.   Specification of Letters Patent.   Patented July 20, 1909.

Application filed February 18, 1909. Serial No. 478,634.

*To all whom it may concern:*

Be it known that we, SAMUEL SILVERMAN and JOSEPH E. TRAHAN, citizens of the United States, residing at Watertown, in the county of Jefferson and State of New York, have invented certain new and useful Improvements in Signals for Pneumatic Tires, of which the following is a specification.

This invention relates to improvements in signals for pneumatic tires, designed for use in connection with the tires of automobiles, auto-trucks and bicycles, and has for its object to provide for giving an audible signal or alarm in case the tires of the vehicle become partially or entirely deflated.

Automobiles and other vehicles upon which pneumatic tires are used, depend for their safe and proper operation upon the tires being inflated to a certain extent by air pressure. All such tires are liable to, and do for one reason or another, become more or less deflated during the operation of the apparatus, and require frequent pumping up. Often the tires become deflated to a dangerous extent before the operator becomes aware of the fact, and punctures and other damages result.

It is an object of the present invention to provide a signal, to be carried by each tire or wheel, which is self-sustaining and self-acting, and which when properly installed will give an audible warning instantly the pressure in the tire falls below a given point, and which will repeat the signal once every revolution until the pressure of the affected wheel is restored. And a further object is to provide a device of the class, which is simple, durable, effective, inexpensive, and which will stand considerable wear and abuse and not get out of order.

To this end the invention consists of a flexible rubber bulb, of peculiar form, which is inserted in the cavity of the outer tire or shoe, and preferably lies between the rim of the wheel and the inner or air tube, in such manner that its outer flexible side is disposed in close proximity to the tread of the tire, in position to be depressed when the tire flattens through deflation.

The invention further consists of a tube which passes through the felly and rim of the wheel and connects with the rim-side of the bulb, by means of which the air contained in the bulb may be forced out, when the tire becomes deflated sufficiently to allow the weight of the vehicle to press the bulb against the rim.

The invention further consists of a whistle adjustably mounted on the outer end of the tube in position to be sounded by the air exhausted from the bulb, to warn the occupants of the car that the tire needs pumping-up. And the invention further consists of means for shielding the whistle from dust and dirt and injury from other causes while the vehicle is in operation.

Other features and parts of the invention will be understood from the detail description which follows, and by reference to the accompanying drawings which form a part of this specification, and in which—

Figure 1 is a side view of a wheel having a pneumatic tire, to which our signal is applied. Fig. 2 is an enlarged longitudinal section of a portion of the wheel, showing the manner of constructing and applying the signal operating parts, the whistle not being shown. Fig. 3 is an enlarged cross-section, substantially on line 3—3 of Fig. 1, showing the construction and arrangement of the complete device; also showing by dotted lines the manner in which the bulb is compressed for sounding the signal, when the tire flattens, as when the latter becomes deflated. Fig. 4 is an enlarged view of the shield for the whistle. Fig. 5 is an enlarged view of the whistle.

Similar characters of reference are assigned to corresponding parts throughout the several views.

In the drawings, 2 represents the hub, 3 the spokes, 4 the felly, 5 the rim, 6 the outer tire or shoe, and 7 the inner or air tube of an automobile wheel. Within the tire 6 preferably centrally between two spokes, and opposite the filling tube 8, we dispose a hollow flexible rubber part or bulb 9, which is preferably made of heavy material similar to that of the outer tire, having the usual fibrous reinforcing 10 to give it strength, and having a large air space or cavity 11. The bulb 9 is preferably made in the form shown at 12, in Figs. 2 and 3, so that it may conform to the rim and also to the inner walls of the cavity of the tire, in order that the bulb may be maintained in proper position. The outer side of the bulb is preferably smooth and rounding, so as to prevent injury to the inner tube against which it normally contacts. The walls of the bulb are preferably made considerably thicker than those of the inner tube, so that the pressure exerted by said tube when inflated with working pressure, may not compress the bulb and exhaust the air therefrom.

13 represents a metallic part or flanged nut embedded centrally in the inner side of the bulb. The part 13 has a threaded perforation 14 to receive a pipe or tube 15, which passes outwardly through suitable openings in the rim and felly. The outer end of the pipe 15 is threaded and a jam-nut 16 is applied and screwed down tightly against the felly to hold the pipe from becoming loose and detached from the bulb. The jam-nut 16 also serves to draw the pipe 15 outwardly and by that means the bulb is drawn and held tightly against the rim and inner wall of the outer tire 6.

17 represents a whistle, the base of which is internally threaded to receive the outer end of the pipe 15, and 18 represents a second jam-nut which is employed for holding the whistle in place.

19 represents a shell or shield which surrounds and incloses the greater part of the whistle and which is connected to the base of the whistle by threads. The shield is provided with a series of openings or windows 20 through which the sound of the signal may be heard. The shield is employed to protect the whistle from injury from contact with objects along the road, and also to prevent dust and dirt from clogging the vents 21 of the whistle. The arrangement of the shield is such that if any dirt should enter the windows when the device is nearest the ground it will be shaken out of the same while the device is being carried around with the tire.

The construction of our tire signal is extremely simple and may be applied readily to any automobile wheel, by simply perforating the rim and felly so as to permit the insertion of the whistle tube 15. The bulb 9 is formed and applied in such manner that it cannot injure the inner or outer tubes of the pneumatic tire, and when properly constructed and applied it is entirely automatic in its operation, self-sustaining, and practically indestructible. The device is shown applied to a wheel having the well known clencher tire and rim, but it may be applied with slight modifications to any other form of wheel.

In practice the rounded outer side of the bulb should extend to within one-half or three-quarters of an inch of the inner tread-wall of the tire, so that when the tire flattens, as all tires do, while working normally, to about the extent shown by the dotted line 22 in Fig. 2, there will still be a small space between the bulb and the tire, and the whistle will not sound a false alarm. But as soon as the pressure falls below its proper or normal working condition the tire will flatten to a greater extent than shown by line 22 and compress the bulb and blow the whistle (see Fig. 3). The insertion of the flexible or resilient bulb 9 within the outer tube does not lessen the resiliency of the tire, and the disposition of the bulb is such that the inner tube may be properly charged with the pressure, and the air may circulate freely the full length of the inner tube. Under this construction and arrangement of the signal parts, the signal will be sounded once each revolution of a deflated tire, or as often as that part of the wheel in which the bulb is located strikes the ground. Owing to the manner in which the device is constructed and applied the weight of the car is utilized to compress the bulb, although the pressure of the air in the inner tube cannot do so. Each time after the alarm is sounded by the exhausting of the air from chamber 11 of the bulb, through the tube 15 and the whistle, as the wheel continues its rotary movement, the bulb will refill, and be ready to give the whistle another blast when the next revolution of the wheel is completed. The more the tire becomes deflated, the louder and stronger will the whistle sound, until it has attracted the attention of the occupants of the car.

Having thus described our invention, what we claim as new and desire to secure by Letters Patent, is—

In a pneumatic tire signal, the combination with a vehicle wheel equipped with an outer and an inner tire tube, of an elastic bulb disposed within the outer tube and between the inner tube and the rim of the wheel, the said bulb having an air chamber provided with a vent on the side facing the rim, the said bulb partially filling the hollow space in said outer tube and adapted to be depressed to exhaust the air therefrom by the flattening of the outer tube, and a whistle carried by the wheel, the said whistle operatively connected to the said bulb and adapted to be sounded by air exhausted from said bulb.

In testimony whereof we affix our signatures in presence of two witnesses.

SAMUEL SILVERMAN.
JOSEPH E. TRAHAN.

Witnesses:
EDGAR H. STROBAUGH,
HELENA L. BARDOL.